A. L. DAVENPORT.
MEANS FOR CREATING RECORDS OF DATA.
APPLICATION FILED OCT. 24, 1921.

1,406,941.

Patented Feb. 14, 1922.

Fig. 1.

Inventor
Arthur L. Davenport,
By
Attorneys

A. L. DAVENPORT.
MEANS FOR CREATING RECORDS OF DATA.
APPLICATION FILED OCT. 24, 1921.

1,406,941.

Patented Feb. 14, 1922.
4 SHEETS—SHEET 2.

Fig. 2.

A. L. DAVENPORT.
MEANS FOR CREATING RECORDS OF DATA.
APPLICATION FILED OCT. 24, 1921.
1,406,941.
Patented Feb. 14, 1922.
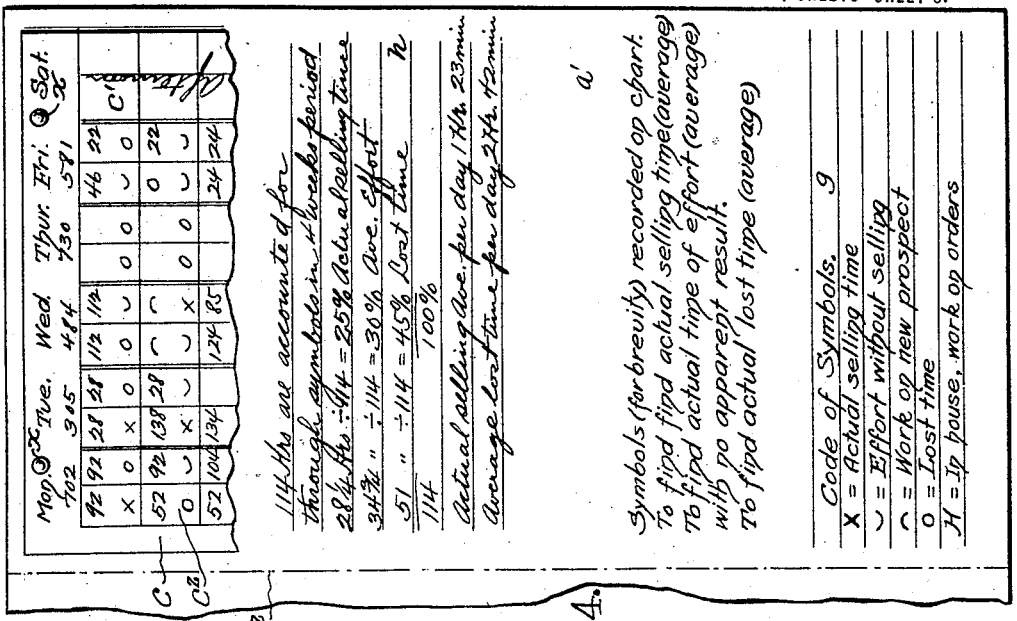
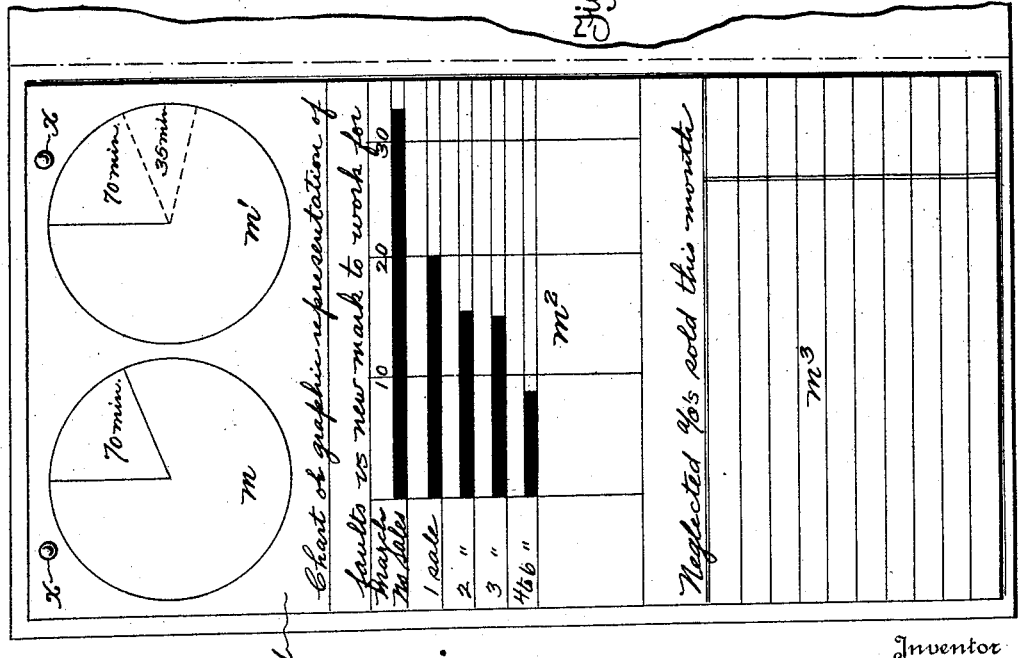

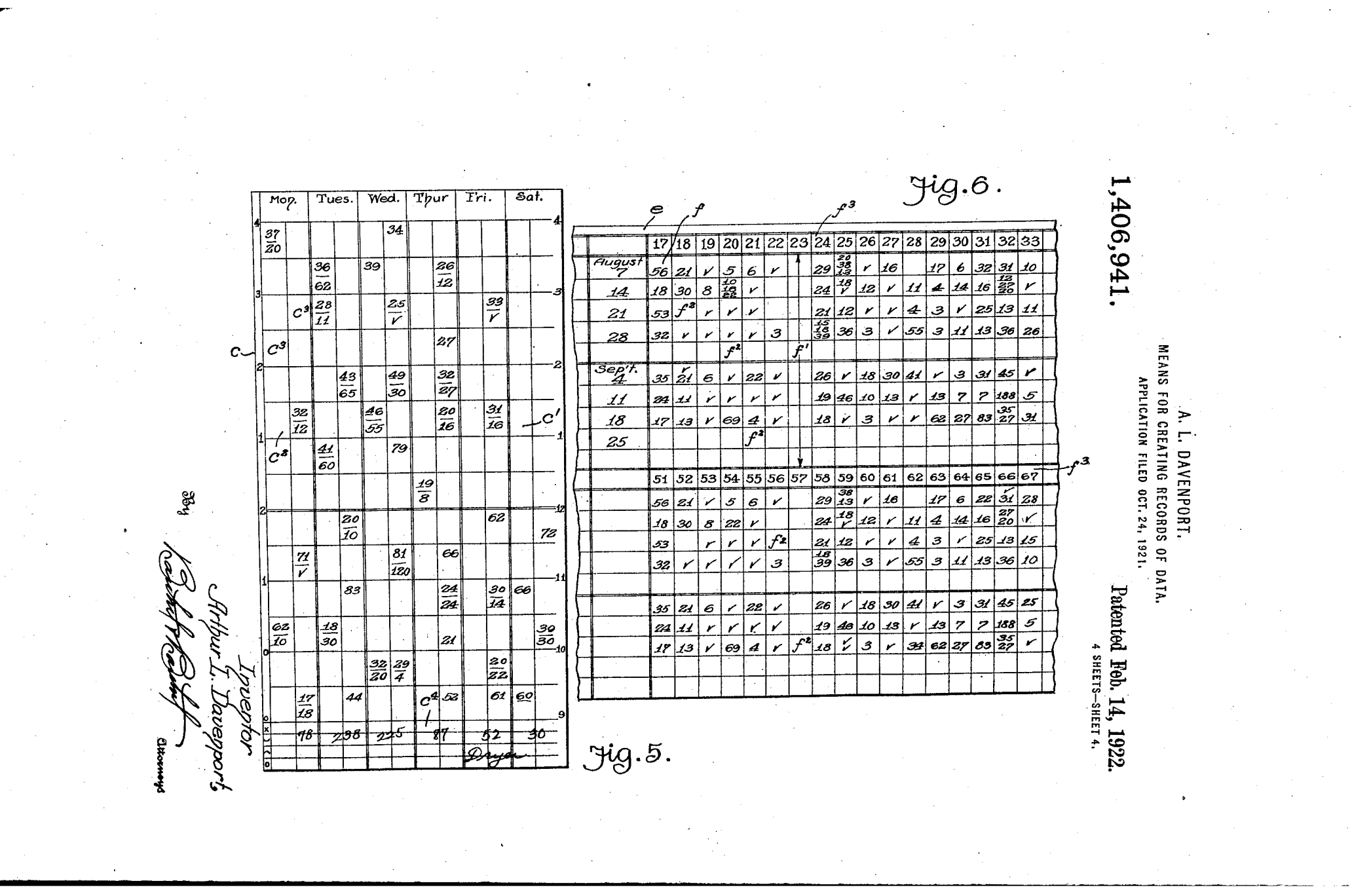

A. L. DAVENPORT.
MEANS FOR CREATING RECORDS OF DATA.
APPLICATION FILED OCT. 24, 1921.

1,406,941.

Patented Feb. 14, 1922.

UNITED STATES PATENT OFFICE.

ARTHUR L. DAVENPORT, OF HIGHLAND PARK, MICHIGAN.

MEANS FOR CREATING RECORDS OF DATA.

1,406,941.  Specification of Letters Patent.  Patented Feb. 14, 1922.

Application filed October 24, 1921. Serial No. 510,093.

*To all whom it may concern:*

Be it known that I, ARTHUR L. DAVENPORT, a citizen of the United States of America, residing at Highland Park, in the county of Wayne and State of Michigan, have invented certain new and useful Improvements in Means for Creating Records of Data, of which the following is a specification, reference being had therein to the accompanying drawings.

This invention relates to improvements in means for creating records of data in a form for use in collating essential facts, pertaining more particularly to the data employed in determining questions pertaining to duty performance.

The invention may be used in various relations, but for the purpose of indicating a simple use and purpose, a brief statement of one use is given, this use being that pertaining to salesmanship.

Salesmen for commercial houses are generally given routes of territory within which the salesman operates; the territory may be that embraced in a section of a city, a number of towns or States, etc. Generally, the salesman carries a list of customers, and these are visited for the purpose of making sales etc., and it may be necessary to make repeated visits before sales are made.

Salesmen may receive salaries alone, salaries and commissions, or commissions alone, but in each instance, the compensation depends more or less upon the final results—the sales made and their value. And these depend to a considerable degree on the manner in which the salesman makes use of the time covering his working hours; in other words, the way in which his particular duty is performed. And this depends upon the way in which a few fundamental factors are being met.

For instance, the use of the present invention in connection with one form of commercial business in a large city, and in which the territory was such as to permit the salesman to make use of the headquarters of his employers as his headquarters, it was found that during a four weeks' period, covering a total working period of 114 hours, 25% of the time covered the actual selling time, 30% the average time involved in the salesman's effort to sell, and 45% the lost time, the records disclosing the fact that while the daily duty period was six hours, the actual selling time was approximately 70 minutes, the average lost time per day being approximately 135 minutes. Since the compensation of the salesman depends substantially on the results obtained in sales, it will be readily understood that if this selling time period can be increased even to a small degree, the compensation can be increased accordingly; in the particular instance referred to, an increase of 35 minutes per day provides a 50% increase in results and hence in compensation.

The purpose of the present invention is to aid the salesman in producing this result by the use of records created by himself by a few moments' labor daily and which present a graphic record of his past performances and which serve as a guide which will permit an increase in effectiveness. This result may be obtained by the use of a few simple factors—the sale, the effort made in the attempt to effect a sale, and the lost time or time wasted; to these may be added the time involved in connection with a new prospective customer, as well as the time employed at the house in overseeing the putting up of orders or in delivering orders; etc.

In the preferred specific embodiment herein disclosed these factors are employed in completing a chart record carrying the evidences of the different factors in suitable form as, for instance, by the use of symbols, the chart being formed in a manner such that the salesman can create his record by fractional hour—quarter-hour—periods, if desired, enabling him at the end of a predetermined period—for instance a week—to note at a glance the general results obtained, the symbols readily recalling to memory the characteristics of the dealing with any particular customer and enabling him to study out other ways of approach etc.

The chart has a portion designed to permit entry of a summary of the totality of time spent on the different factors, so that it will permit the salesman to readily see possibilities of improved results by comparing the different factors.

In preparing the chart, the symbol notations combine with identifying indications as given by a schedule of the customers forming the route of the salesman. The schedule may have the identifying indicia in the form of a progression of numbers or of letters, etc., the purpose being to give the customer an individual indication by which he can be identified in creating the record data of the present invention. By employing the identifying indicia the records can be completely kept within a chart of relatively small dimensions and thus permit of the salesman carrying the embryo record carrier in his pocket, if desired. In addition, the use of identifying indicia in the records instead of the name of the customer permits the chart record to present a more or less "bird's-eye" effect, in that the symbol notations do not become smothered in a way to prevent the salesman gaining a clear knowledge of the characteristics of his work performance without laboriously studying the developed chart in detail.

The chart is preferably of dimensions such as to permit the records of the working days of a week to be kept thereon, but for the purpose of creating additional data to aid the salesman in his work and in finding solutions to increase the results, it is desirable to employ a blank which presents the data of the chart in a different form, and arranged to cover a period of some length, as for instance a month or two, thus covering the period of a succession of charts. This blank, which might be termed a customer's index or record, is divided in such manner as to provide a plurality of columns, with each column individual to an individual customer as found on the schedule, and this record is created by the salesman from the indicia of the chart. For instance, in the preferred form, each fractional hour period of the chart carries information of some sort—those fractions which do not fall within the "lunch" hour carrying the symbol notations. Where the duty performance is in connection with a particular customer, the identifying indication of that customer is employed with the symbol notation. As a result, it is possible for the salesman, at the close of the week, to rapidly duplicate the symbol notations found on the chart in connection with any particular customer, into the space representing that particular week in the column of the customer. By continuing this during the extended period, this index is created with the index carrying the essential facts bearing on the relations of the salesman and customer.

This will be readily understood from the fact that by such duplication the index will graphically present the number of fractional-hour periods individual to the customer (the number of symbols found on the chart being duplicated on the index), and also the characteristics embraced in the relations between salesman and customer during these periods (provided by the difference in symbols duplicated); it is immaterial, for the purpose of the index, as to what particular day of the week the salesman's visit or visits were made—the essential is to ascertain the number of fractional periods spent with the individual customer and the results which flowed from the visits. With an unfavorable record thus produced in connections with the efforts made with an individual customer, it is possible to study the needs and formulate a change in method of approach or dealing, which will produce more favorable results; or it may serve to demonstrate the uselessness of further effort, and permit the salesman to spend this time under more favorable conditions. The index also serves as a guide to the salesman in laying out his work for the day, through graphically presenting symbol notations pertaining to the various customers such as will permit the salesman to select the customers to be visited on the basis of past results rather than on simple possibilities.

The data thus accumulated, first through the use of the schedule and the created chart record, and then the creation of the index, provides a record evidence which will permit ready study through comparisons, such as to enable the salesman to reduce the value of the factor of lost time and increase the value of the factor of actual selling time, with a consequent increase in recompense to the salesman. And the data is in such form as to permit the salesman developing diagrams which will graphically present percentages, etc., of past performance and present the evidences of improvement progression or retrogression.

While the records so made could be employed for the purpose of checking up the time of the salesman by the proprietors of the establishment, they are designed particularly for the benefit of the salesman, who, under such conditions, has no incentive to pad the records and set up a fictitious data record—the fictitious record made would itself bear evidence to the proprietor of its untruthful character.

The data is created by the expenditure of a few minutes' time daily by the salesman, and by the additional time—a small period —required to transfer the weekly record from the chart to the index, so that it does not materially increase the work of the salesman.

The invention also contemplates utilizing the fundamentals in a simplified form in which some of the factors of the preferred form are discarded. For instance, the secrecy of the symbol notations can be omitted, and the indications presented in the form of symbol notations may be in the form of numerals—both forms serving as indications—these, with letters, being considered as equivalents; and where the numeral form is used, the indication may be presented in the form of the amount of the bill of goods sold, the fractional parts of the dollar being omitted for convenience. And further simplification may be had by placing the identifying indication but once in the daily or chart record, or by omitting any indication other than the identifying indication where an actual sale has not been made, the presence of the identifying indication and the omission of the additional indication making clear the fact that the factor of lost time "effort" was present, the omission of any indication whatever indicating "lost time"; simplification may be had by using either or all of these methods of simplification.

And, if desired, the simplification may extend to the use of undivided hour spaces or a non-requirement of accuracy in locating the indications within the specific hour, as long as the complete record of the day contains the individual items which represent the activities of the day.

Such simplified methods do not, of course, permit the detailed analytical study by the salesman or employer of the different factors involved, but can be readily substituted where the system is used under conditions where the value of the bill of goods sold will itself present the approximate evidence of the time spent in effecting the sale, or under conditions where the salesman is operating on the basis of a definite time limit as to the length of time he will spend with a customer.

Where the method of producing the chart is changed by substituting numerals for symbols, the method of completing the record blank is also changed, the sale amount numerals being used in place of symbols and, if desired, a simple symbol employed to indicate failure to effect a sale, the record in such case indicating the number and results of visits made within the chart period instead of the length of time spent with the customer during a corresponding period as in the preferred form.

To these and other ends, therefore, the nature of which will be readily understood as the invention is hereinafter disclosed, said invention consists in the arrangement and combinations of elements hereinafter more fully described, illustrated in the accompanying drawings, and more particularly pointed out in the appended claims.

In the accompanying drawings, in which similar reference characters indicate similar parts in each of the views;—

Figure 1 is a plan view of a carrier opened up to expose a schedule and a chart used in carrying out the present invention, the blanks for the schedule and chart being shown in a more or less developed form;

Fig. 2 is a plan view of the carrier opened up at a different point to show the customer index or record, the latter also being shown in developed form;

Fig. 3 is a face view of a blank which may be employed to produce diagrammatic results found through the comparison of the data created in connection with the use of the blanks of Figs. 1 and 2;

Fig. 4 is a face view of a portion of the carrier;

Fig. 5 is a face view of a chart as used in a simplified method for practicing the system;

Fig. 6 is a face view of a portion of a record blank as used under the method of Fig. 5.

For the purpose of conveniently supporting the various blanks employed, any suitable form of carrier may be employed, that shown being in the form of a folder —$a$— of suitable material such, for instance, as paper board or card board, the folder being preferably of a stiff characteristic. In the particular embodiment shown the folder includes four pages, the second and third pages being provided by a leaf —$a'$—, secured in a suitable manner, the folder being foldable on the line —$a^2$—. Obviously, the folder may carry additional leaves, to carry additional data.

The schedule is in the form of a blank —$b$—attached to one of the pages of the folder—shown as the inside page of the folder—in any suitable manner, as by paper fasteners —$x$—. In the particular embodiments shown, the schedule is designed to carry the names of the customers comprised in the list which the particular salesman serves—constituting his route,—the identifying indicia being in the form of a progression —$b'$— of numerals, the names of the customers being arranged opposite the numerals so as to give each customer an individual identifying indication for use in the remaining blanks. In the drawings, the complete list of customers is not indicated, those shown being represented by the character —$b^2$—. In practice, the blank schedule—which may be of greater length than the folder and foldable—carries the progression and the names are added in any suitable arrangement; for instance, with the customers on the route all known, the arrangement may be alphabetical for ease in finding the identification indication, new customers being added at the end of the list.

The chart of the preferred form is in the form of a blank —$c$— divided substantially as shown in Fig. 1, by vertical and horizontal lines to produce a succession of vertical divisions —$c'$— corresponding in number to the six working days of the week, and divided horizontally into divisions —$c^2$— corresponding in number to the general working hours of the day—for instance from "9" in the morning to "4" in the afternoon. The vertical divisions carry the names of the days of the week, and the horizontal divisions carry the numerals "9," "10," "11,"

"12," "1," "2," "3" and "4." The line intersections produce a plurality of spaces which represent the period of an hour each but for the purpose of producing the complete data of the preferred form, these spaces are subdivided, preferably into quarters—as by the use of lines dividing the vertical and horizontal divisions, so that the final ruling presents each of the spaces —$c^3$— as representing a quarter-hour period. If desired, the subdivision may be omitted.

The hour indications may be arranged from top to bottom or in the reverse direction, the latter being shown in the drawing. Since the spaces are but quarter-hour periods, each hour space carries four of the spaces —$c^3$—, and for convenience, these are followed in a more or less sequence in applying the notations. This sequence may be in any desired order, that shown being indicated in Fig. 1 by the reference characters —$p'$—, —$p^2$—, —$p^3$—, and —$p^4$—, thus providing a reading of the chart by beginning at the lower left hand space —$c^3$— of the hour section, then to the right, then up, then to the left—completing the section—and then up into the first space of the succeeding section.

In the particular form of the chart shown in Fig. 1, the vertical division lines are extended below the space-forming portion just described, and divided by horizontal lines into divisions —$c^4$— each designed to permit recording of the total indications of the different factors into which the duty performance is divided, these divisions carrying symbols corresponding to those used in the notations; the particular code of symbols used in the embodiment shown is indicated at —$g$— in Fig. 4, this code, if desired, being printed on the leaf —$a'$— to underlie the chart.

For the purpose of illustrating the manner in which the data is created and used, the chart and customer's index or record shown in the drawings are replicas of the completed blanks found in the records of two different salesmen operating for a large commercial house, the two records therefore not being complemental to each other, due to the fact that the record of the salesman producing the chart had not completed the total period represented by the index or record. The arrangement, however, will be understood from the description.

Referring to the chart —$c$—, the first quarter-hour on Monday was spent in the house; the salesman then went to customer 97 and attempted to make a sale during the second and third quarter hours but was unsuccessful—the second quarter-hour space carrying the symbol of "effort," the third carrying the symbol of lost time. The salesman then went to the establishment of customer 75 but the effort was useless. This covered the hour between nine and ten o'clock. He then went to customer No. 1, apparently found the proprietor busy; the salesman waited and during the second quarter-hour tried to sell, but was unsuccessful, the first quarter-hour being "lost time." He then visited customer 43, and after effort made the sale. The next quarter-hour (11 to 11:15) carries no designation of a customer, while the succeeding quarter hour shows time spent with customer 43—the customer of the previous half hour period—with the time spent indicated as lost. The earlier quarter-hour carried the symbol of "selling effort," and the particular form of succession of symbols may indicate that after the sale to customer 43 there was a possibility of sale of some commodity other than that had by the salesman as a sample and it was necessary for him to secure it, after which the salesman returned to the customer but could not make the sale. Such interpretation would, however, present evidences of an improper marking of the chart, since, in such case, the earlier quarter-hour should also carry the symbol 43. It is possible that the sale made to customer 43 was large and required immediate service such as telegraphic, after which the salesman returned to the customer for a social chat.

This particular marking indicates one of the features of the system—its secrecy. The succession of markings have, of course, a clear meaning to the salesman who is making the record; to any one else the record is more or less blind. In making the record the salesman is charging himself with the quarter-hour effort without result—this forming a part of his totals for the day; the manner in which the time was spent is known only to the salesman. If he desires to explain to the sales manager the salesman can readily do so, but to the manager it is more or less unimportant; the chart is not designed as a check by the manager, but an aid to the salesman, and in reviewing the record of the day or week the particular meaning will be known to the salesman and he can determine for himself the method for eliminating this lost effort, if the loss could be avoided.

After the last quarter-hour with customer 43 the chart shows a quarter hour spent in work on a new prospect, and the last quarter-hour before lunch as wasted. After lunch a half hour was spent with customer 91 and a sale made, the succeeding half-hour was spent with customer 99 without any results, the succeeding three-quarters hour with customer 104, without results, followed by a half-hour with customer 52, also without result, the last three-quarters hour of the day being spent with customer 92, the intermediate quarter-hour of which was lost time—possibly the customer was called away from the conference—the last quarter-hour showing the sale as having been made.

At the top of the column the figures "702" indicate the total amount of the sales made during the day, while the spaces —$c^4$— at the bottom of the chart receive the totals represented by the individual quarter-hour symbols. For instance, at the bottom of the column, just described in detail are placed the total number of sales as "3" with the time involved indicated as ¾ hour; the number of quarter-hour periods of "effort without selling" being "11" with the time involved indicated as 2¾ hours; the total of periods occupied on "work on new prospect" is "1", representing a quarter-hour, and the total of "lost time" periods being "9", the total time being 2¼ hours. As shown in connection with the "Tuesday" column, it is unnecessary to indicate the number of times the symbol appears in a column, the information desired being the time actually spent.

As will be understood, the chart will be developed by the work done each day, so that at the close of the week it will present a graphic record of the quarter-hour periods spent during the working hours. For instance, in the chart shown, Thursday afternoon indicates total lost time without customer indication, indicating that a holiday was taken. Similarly, Saturday afternoon was the usual holiday.

At the end of the week the totals of time for the week are indicated in the divisions —$c^4$— those of the last column being added to the previous totals, the work done on Saturday being short and readily tabulated without a special column. With those details before him, the salesman is able to readily determine the results of his work, and having the itemized chart as a guide, is able to change his methods to produce a more favorable result and thereby increase his earning capacity.

The schedule —$b$— and chart —$c$— may be employed alone in carrying out the present invention, the salesman employing a separate chart for each week, through examination of the several charts and comparisons made between them, obtain the information he desires to determine whether or not he is making any improvement in results. And he can graphically record the results by the use of the chart —$d$— shown in Fig. 3, which can be used to give certain data covering a predetermined period. For instance, assuming a period of four weeks in which 114 hours are accounted for, and the total time devoted to the several factors is as indicated in the illustrative showing shown at —$h$— in Fig. 4, the average selling time each day is approximately 83 minutes; this latter showing was made by a salesman who had practiced the system for a short while, experience having demonstrated, however, that the average without the system was approximately 70 minutes per day, and this is used in the diagram —$m$— and —$m'$— in Fig. 3, as the basis of comparison for improvement, diagram —$m$— indicating the time per day under usual conditions, the added 35 minutes of diagram —$m'$— representing a fifty per cent gain as a goal, the salesman endeavoring to increase his earning capacity by this amount.

Diagram —$m^2$— of Fig. 3 permits a graphic record of the sales made during the period, the total sales of the period being represented in the upper line, those in which but a single sale is made to a customer during the period, indicated by the second line, those to whom individual sales were made during the period being indicated by the third, etc.

Memorandum —$m^3$— of Fig. 3 permits recording of "neglected accounts" sold during this period, these being of customers to whom but little attention had been previously paid.

However, I prefer to amplify the general system by the use of the blank shown in Fig. 2, the blank being indicated generally at —$e$— and shown as a sheet foldable upon itself at —$e'$—, and secured to the folder. Obviously the sheet may be of larger dimensions to permit of more than one fold, or more than one of the blanks may be employed.

Blank —$e$— is made up of a plurality of vertical columns —$f$—, with the column divided by horizontal rulings into sections —$f'$—, each section in turn being divided into spaces —$f^2$— by horizontal lines. In the particular form shown, the spaces —$f^2$— indicate the period of a week, and the sections represent the weeks of two months, the blank having columns to receive date and month indications, the date indications being those of the beginning or ending of the week as may be desired.

Each section —$f'$— preferably carries a heading space —$f^3$—, and these preferably carry the progression of numerals or other symbols —$b'$— shown in the schedule. The spaces of a section are to receive the symbols shown in chart —$c$— so far as they bear on the source indicated by the symbol —$b'$—, the number and character of symbols shown on the chart being duplicated on blank —$e$—.

As heretofore pointed out, the blank illustrated is that of the actual record of a salesman, the records of the chart and blank shown not being complemental since they are the records of two different salesmen. To explain the operation of this blank, a brief explanation of the showing of different sections of columns is made.

Column 1 shows that in the week of March 6th, the salesman called on this customer on two different days—the division of the space indicating that the two periods were not successive—the first time being "lost time," the second being "effort without selling". In the week of March 27th, one visit was made which was "effort without selling". Column 2 shows visits each week during the period, the number of quarter-hour periods being indicated by the number of symbols shown, the results being indicated by the symbol form. In section 14, practically a half day was spent in the week of April 22. In column 23, the selling period extended over two quarter-hour periods.

The blank record is compiled from the record of chart —c—, the salesman placing his symbols at the close of the week, or if desired, at the close of the day. When completed, as well as during its development, it serves as a guide to the salesman, showing graphically different characteristics useful to the salesman. For instance, customer 5 seems more or less hopeless as a customer; customer 3 was difficult but decided to give an order; customer 2 may be pretty well stocked, etc. It also indicates those who have been neglected; those not amenable to the usual methods of salesmanship etc. As a result, the salesman can more readily conserve his time by noting the general characteristics shown by the record of the blank, and thus develop increased results; and with difficult customers the attention can be centered on the individual characteristics of the customer himself with a view to developing a different line of approach.

Obviously, the record of blank —e— is adapted for the ready production of the diagrams of chart —d— as well as to give the salesman knowledge of those neglected and which will permit of the use of memorandum —$m^3$—.

While designed as an aid to the salesman, the records made can be utilized by the sales manager, and will permit of collaboration between the salesman and his manager with a view to meeting different conditions made evident by the record of the blank.

The system is not limited to use in connection with salesmanship of commodities, but is adaptable for other uses, either for the benefit of the employer or employee.

For instance, one such use is in connection with stores, wherein the schedule may be made of articles of merchandise, and where the proprietor desires to gain a clearer conception of the work to permit of more efficient results being obtained. In this a considerable variety of factors can be obtained by the use of the chart and blank, those factors being found during periods of definite time,—for instance a month. As an example, one period of use may give the factors shown in the drawings,—lost time, improved time and actual selling time—each salesman or saleslady having the individual folder and recording the manner in which the time was occupied during the quarter-hour periods; another period of use may be devoted to the recording of good, medium and poor sales, referring to monetary value of the purchases, the classes being determined, as for instance, good sales may be those of articles of $10 value and over, medium ranging from $5 to $9.99 and poor those below $5, these being simply illustrative, the clerk recording the number made of each during the quarter-hour periods; another period may be used to ascertain the best, medium and poor selling items of merchandise; another period may be devoted to suggestive salesmanship, to ascertain the more valuable clerks, the factors in such case being "sales through suggestion", "sales called for"—the sales being only those in which the purchaser calls for the particular article or articles and in which the sale of other articles is not due to the suggestion of the clerk—and "turn over sales"—sales made by one clerk after another has failed; another period may be devoted to luxuries and staple merchandise; another to ascertaining the best selling hours, the division being of best, medium and poor; another period may be devoted to ascertaining the number of sales made or lost per 100 customers, etc.

The various factors are too numerous to be obtained at any one time without requiring a large amount of time of the clerk in making the record, and hence the division into periods of use in which similar symbols may be given different meanings in the different periods. Obviously, the numeral progression of the schedule may be varied to employ letters and letters and exponents, etc., these various indications falling within the general meaning of symbols.

Another use may be in connection with insurance or real estate prospects, the salesman giving each prospect a symbol indication in the schedule, adding each name when developed, and making record of visits, etc.

As will be understood, in each of the uses the purpose is to ascertain certain facts pertaining to the particular business, the invention being useful in producing the data which is essential in collecting the essential facts to be developed, the general arrangement being such that the data can be produced in a simple and efficient manner, and when produced is in a form readily understood and capable of being analyzed without requiring the production of additional data and the labor and time required to produce it.

The preferred form and methods just described may be simplified where the conditions do not necessitate the use of all of the factors referred to.

This simplification can be obtained for instance by using a less number of symbols or by making use of the fact that the presence of an identifying indication and omission of a duty performance symbol will itself indicate a factor of time spent with the customer. This omission meaning may take the place of one of the non-sale visual indications—and thus take on the status of an indication—so where the conditions are such that the data as to the particular characteristic of the "non-sale" condition is unimportant, this "omission" indication may take the place of all symbol indications with the exception of the symbol indicative of a sale being made.

Where, however, simplification in the direction indicated is desired, I prefer to change the form of the duty performance indications from the symbol notation form to a form in which numerals or letters take the place of the arbitrary symbols. This change permits flexibility in another direction, since either numerals or letters will permit the duty performance indication of sale to also indicate the amount of sale. Where letters are employed they may have the characteristics of a secret code to represent numeral values, thus maintaining the secrecy of the system; obviously the numeral form of indication may also be employed, the numerals which represent the amount of the sale being the indication in such case.

In Fig. 5, I have shown the use of the numeral form, the upper numerals of a pair of indications indicating the customer, the lower numerals indicating the amount of sale. Where but one indication is used, it denotes the customer, the absence of the second written indication presenting conditions of the indication by omission characteristic. In some cases a simple check mark is shown as the second indication, to demonstrate the use of a single indication for "non-sale" conditions and which may be a substitute for the "indication by omission" or for the several symbol indications in the preferred form. Or this check mark indication may be used in conjunction with the "indication by omission", thus enabling such "non-sale" condition to be divided into factors. It will be observed, of course, that the numeral or letter form of the amount of sale may be utilized in the perferred form.

Another possible variation from the preferred form is shown in Fig. 5 by presenting the data bearing on a visit to the customer and its results by a single indication or pair of indications, the graphic indication of a day's activities indicating characteristics by the number of visits made, the general activity being made apparent by the general knowledge of the approximate time required per visit; the schedule may be used for purpose of ascertaining more detailed time factors since the relative location of customers and the time necessary to go from one to another is known or readily accessible, this being deducted to obtain a closer approximation of actual time.

Where the conditions are such as to not require accuracy in indicating the order of visits the locations of the indications in the hour spaces corresponding to the exact hour of the visit need not be strictly adhered to.

And this simplification may be carried into the record blank as indicated in Fig. 6, the notations being those employed in the chart—the numeral indication form being shown. Where the second indication is by "omission", or is by the use of the check mark, this mark may be used in the record blank to indicate the making of an unfruitful visit. Or when this particular factor is not desired, the notations may be limited to the "amount of sale".

For purpose of illustration, I have shown the use of the same chart delineations in Figs. 1 and 5. It will be obvious, however, that in some cases of the simplified examples above pointed out, the hour subdivisions may be omitted.

In the form of chart indicated in Fig. 5, I have shown the total amounts or aggregates of sales during the day in the spaces at the bottom of the daily columns instead of at the top, as in Fig. 1, such showing indicating a summary of characteristics of duty performance during the day.

As will be understood, the simplified forms do not give all the factors desired for the collating of the data in as great detail as in the preferred form, thus reducing the ability to analyze the essential data on the basis of actual record evidence. Hence, I prefer to utilize the general methods of the preferred form. It is possible, however, to obtain some of the essentials by using the simplified forms and thus decrease the zone of "estimated values" to a point where approximate correctness may be obtained.

While I have herein shown and described several forms, which the invention may take, and have described various ways of its application and use, it will be readily understood that various changes and modifications therein may be found desirable or essential in meeting the various exigencies of use, and I desire to be understood as reserving the right to make any and all such changes or modifications therein as may be found desirable or necessary, insofar as the same may fall within the spirit and scope of the invention as expressed in the accompanying claims when broadly construed.

What I claim is:—

1. As a means for creating records of data in a form for use in collating essential facts covering duty performance during predetermined periods, a schedule carrying identifying indications arranged in a definite order and also having spaces to receive the indications representing the definite sources of the data to be collected, with the identifying indications individual to the source indications, a chart having delineated spaces to receive indications, one of such indications representing an individual source of data presented by such schedule, the dimensions of such delineated spaces being such as to receive a second indication indicative of a duty performance characteristic, said spaces being arranged in a manner to produce a time schedule of uniform periods each representing fractions of a day and with the periods arranged in a definite sequence, the periods being in divisional arrangement with successive divisions representing successive days, and a blank divided to produce spaces arranged in a succession of divisions with each division individual to the individual sources presented in the schedule, the spaces of a division of such blank being sufficient in number to receive the data covering the periods of a succession of charts with each space adapted to receive duplicates of the duty-performance indications individual to the particular source found in the chart covering the period represented by the space of the blank, whereby the completed blank will graphically present characteristics of the duty-performance during the period covered by the blank record.

2. As a means for creating records of data in a form for use in collating essential facts covering duty performance during predetermined periods, a schedule carrying identifying indications arranged in a definite order and also having spaces to receive the indications representing the definite sources of the data to be collected with the identifying indications individual to the source indications, a chart having delineated spaces to receive identifying and symbol indications arranged in a manner to locate the data pertaining to fractional-hour duty performance in divisional arrangement with successive divisions representing successive days, the symbol indications representing specific characteristics embraced in the duty performance and the identifying indications those presented by the schedule, and a blank divided to produce spaces arranged in a succession of divisions with each division individual to the individual sources presented in the schedule, the spaces of a division being sufficient in number to receive the data covering the period of a succession of charts with each space adapted to receive duplicates of the symbols individual to the particular source found in the chart covering the period represented by the space of the blank, whereby the completed blank will graphically present the totality of time devoted to the individual source and the specific characteristics of the duty performance had during the period covered by the blank record.

3. As a means for creating records of data in a form for use in collating essential facts covering duty performance during predetermined periods, a schedule carrying identifying indications arranged in a definite order and also having spaces to receive the indications representing the definite sources of the data to be collected with the identifying indications individual to the source indications, and a chart divided to produce a plurality of data-receiving spaces arranged in vertical and horizontal series with the series in one direction having day indications arranged in succession and the series in the other direction having successive hour indications with the latter corresponding to the usual working hours of the user of the means each of said chart spaces being adapted to receive indications pertaining to different forms of data, one of such indications representing an individual source of data presented by such chart, the dimensions of each delineated hour space being such as to receive a second indication indicative of a characteristic embraced in the duty performance pertaining to the individual source represented by the first indication, said chart also having additional delineated summary spaces in alinement with the hour spaces of a day, said summary spaces being adapted to receive indications graphically presenting aggregates of duty-performance characteristic recorded on the chart, each summary indication being positioned in the summary space located in alinement with the hour spaces of the day the record of which is summarized by the indication, whereby the chart will graphically indicate characteristics of duty performance of the total period with the duty characteristic factors of the period presented in individual and collective relation, and means for supporting the schedule and chart.

4. As a means for creating records of data in a form for use in collating essential facts covering duty performance during predetermined periods, a schedule carrying identifying indications arranged in a definite order and also having spaces to receive the indications representing the definite sources of the data to be collected with the identifying indications individual to the source indications, and a chart divided to produce a plurality of data-receiving spaces arranged in vertical and horizontal series with the series in one direction having day indications arranged in succession and the series in the other direction having successive hour indications with the latter corresponding to the usual working hours of the user of the means, each delineated space within the latter series representing fractional hour periods, said chart spaces being adapted to receive both symbol and identifying indications, with the symbol indications representing specific characteristics embraced in the duty performance during the particular time period represented by the chart, the identifying indication being that of the particular source of the schedule in connection with which the specific characteristics of the duty performance is had during the space period, said chart also having additional delineated summary spaces in alinement with the hour spaces of a day and in series arrangement with the several symbol indications used in collecting the data, with the arrangement such that the total time-length occupied in the duty represented by the symbol during the period of a day may be graphically indicated to permit summation of the total time-length covering such individual duty performance for the total period of the chart, whereby the chart will graphically indicate the duty performance of the total period with the duty characteristic factors presented in individual and collective relations, and means for supporting the schedule and chart.

5. Means as in claim 4, characterized in that the schedule and chart are relatively supported in a manner to be concurrently exposed.

6. Means as in claim 4, characterized in that the identifying indications of the schedule are of different characteristic from the duty-performance symbol indications of the chart to provide contrasting indications when utilized in the same spaces.

7. In means for creating records of data in a form for use in collating essential facts covering duty performance during predetermined periods, and wherein the sources of the data collected are given individual identifying indications, a chart divided to produce a plurality of data-receiving spaces arranged in vertical and horizontal series with the series in one direction having day indications arranged in succession and the series in the other direction having successive hour indications with the latter corresponding to the usual working hours of the user of the means, the spaces of the hour series being uniformly sub-divided to produce individual spaces each arranged to receive indications germane to the duty performance of a fractional hour period and with dimensions such as to permit use of the indications therein greater in number than one with each indication representing a single item, the position of the several spaces of the fractional hour periods being such that the development of the data in each hour period will be similar in successive hours and in a manner to complete the daily data record in a form for ready summation, while maintaining the individuality of the fractional-hour data.

8. A chart as in claim 7, characterized in that the hour spaces are sub-divided into quarter-hour period by intersection vertical and horizontal lines to produce a formation permitting a succession of quarter-hour period records in which the initial and final periods of an hour are in superposed relation with the final period of one hour and the initial period of the succeeding hour superposed.

9. Means as in claim 1, characterized in that the schedule, chart and blank are carried by a folder, with the schedule and chart positioned to be concurrently exposed.

10. Means as in claim 1, characterized by a supplemental chart carrying diagrams to permit comparative totals to be graphically illustrated.

In testimony whereof I affix my signature in presence of two witnesses.

ARTHUR L. DAVENPORT.

Witnesses:
HORACE G. SEITZ,
ANNA M. DORR.